United States Patent
Fujishiro et al.

(10) Patent No.: US 10,932,300 B2
(45) Date of Patent: Feb. 23, 2021

(54) COMMUNICATION CONTROL METHOD, RADIO TERMINAL, AND BASE STATION

(71) Applicant: KYOCERA Corporation, Kyoto (JP)

(72) Inventors: Masato Fujishiro, Yokohama (JP); Hiroyuki Urabayashi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/572,977

(22) Filed: Sep. 17, 2019

(65) Prior Publication Data

US 2020/0015279 A1 Jan. 9, 2020

Related U.S. Application Data (63) Continuation of application No. PCT/JP2018/007694, filed on Mar. 1, 2018.

(30) Foreign Application Priority Data

Mar. 23, 2017 (JP) .............................. JP2017-056934

(51) Int. Cl.
H04W 74/08 (2009.01)
H04W 74/00 (2009.01)
H04W 4/70 (2018.01)

(52) U.S. Cl.
CPC ......... H04W 74/0833 (2013.01); H04W 4/70 (2018.02); H04W 74/006 (2013.01)

(58) Field of Classification Search
CPC . H04W 74/0833; H04W 74/006; H04W 4/70; H04W 68/005
See application file for complete search history.

(56) References Cited

U.S. PATENT DOCUMENTS 8,199,710 B2 6/2012 Kato et al.
8,223,789 B2 7/2012 Kato et al.
(Continued)

FOREIGN PATENT DOCUMENTS

JP S63103525 A 5/1988
JP 2008244654 A 10/2008
(Continued)

OTHER PUBLICATIONS

Nokia, Alcatel-Lucent Shanghai Bell, Random access on non-anchor PRB for NB-IoT, 3GPP TSG RAN WG1 Meeting #86-bis, R1-1608886, Oct. 10-14, 2018, 3pages, Lisbon, Portugal.
(Continued)

*Primary Examiner* — Afshawn M Towfighi
(74) *Attorney, Agent, or Firm* — Studebaker & Brackett PC (57) ABSTRACT

A communication control method comprises a step S1 of transmitting, by a eNB 200, a paging message to a UE 100 by using a first frequency channel included in a plurality of frequency channels, a step S2 of receiving, by the UE 100, the paging message, a step S3 of selecting, by the UE 100, a second frequency channel included in the plurality of frequency channels, and a step S4 of transmitting, by the UE 100, a random access signal for establishing connection with the eNB 200 by using the second frequency channel. The paging message includes channel identification information used for selecting the second frequency channel. In the step S3, the UE 100 is configured to select the second frequency channel based on the channel identification information included in the paging message.

6 Claims, 9 Drawing Sheets

(56) References Cited

U.S. PATENT DOCUMENTS

| | | |
|---|---|---|
| 8,228,846 B2 | 7/2012 | Kato et al. |
| 8,837,409 B2 | 9/2014 | Kato et al. |
| 9,094,989 B2 | 7/2015 | Kato et al. |
| 9,326,300 B2 | 4/2016 | Kato et al. |
| 9,538,556 B2 | 1/2017 | Kato et al. |
| 10,075,984 B2 | 9/2018 | Kato et al. |
| 10,433,340 B2 | 10/2019 | Kato et al. |
| 10,447,441 B2 | 10/2019 | Futaki |
| 2014/0126516 A1* | 5/2014 | Kato ................ H04W 74/0833 370/329 |
| 2016/0205555 A1* | 7/2016 | Agiwal ............ H04W 12/0401 713/168 |
| 2019/0364604 A1 | 11/2019 | Kato et al. |
| 2019/0393997 A1 | 12/2019 | Futaki |

FOREIGN PATENT DOCUMENTS

| | | |
|---|---|---|
| WO | 2008/053653 A1 | 5/2008 |
| WO | 2008153365 A2 | 12/2008 |
| WO | 2011/052643 A1 | 5/2011 |
| WO | 2012/017841 A1 | 2/2012 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network(E-UTRAN); Overall description; Stage 2 (Release 14); 3GPP TS 36.300 V14.1.0; Dec. 2016; pp. 1-317, Valbonne, France.

* cited by examiner

COMMUNICATION CONTROL METHOD, RADIO TERMINAL, AND BASE STATION

RELATED APPLICATIONS

The present application is a continuation based on PCT Application No. PCT/JP2018/007694, filed on Mar. 1, 2018, which claims the benefit of Japanese Patent Application No. 2017-056934 (filed on Mar. 23, 2017). The content of which is incorporated by reference herein in their entirety.

TECHNICAL FIELD

The present invention relates to a communication control method, a radio terminal, and a base station for a mobile communication system.

BACKGROUND ART

In recent years, radio terminals that provide machine type communication (MTC) and internet of things (IoT) services in which communication is performed without human have attracted attention. Such radio terminals need to realize low cost, wide coverage, and low power consumption. Thus, in the 3rd generation partnership project (3GPP), new categories of radio terminals each having a transmission and reception bandwidth restricted to only a part of a system transmission and reception band are specified. An enhanced coverage function including repetitive transmission (repetition) or the like is applied to such radio terminals belonging to the new categories.

SUMMARY

A communication control method according to one embodiment is used in a mobile communication system. The communication control method comprises a step A of transmitting, by a base station, a paging message to a radio terminal by using a first frequency channel included in a plurality of frequency channels, a step B of receiving, by the radio terminal, the paging message, a step C of selecting, by the radio terminal, a second frequency channel included in the plurality of frequency channels, and a step D of transmitting, by the radio terminal, a random access signal for establishing connection with the base station by using the second frequency channel. The paging message includes channel identification information used for selecting the second frequency channel. In the step C, the radio terminal is configured to select the second frequency channel based on the channel identification information included in the paging message.

A radio terminal according to one embodiment is used in a mobile communication system. The radio terminal comprises a receiver configured to receive, from a base station, a paging message transmitted by using a first frequency channel included in a plurality of frequency channels, a controller configured to select a second frequency channel included in the plurality of frequency channels, and a transmitter configured to transmit a random access signal for establishing connection with the base station by using the second frequency channel. The paging message includes channel identification information used for selecting the second frequency channel. The controller is configured to select the second frequency channel based on the channel identification information included in the paging message.

A base station according to one embodiment is used in a mobile communication system. The base station comprises a transmitter configured to transmit a paging message to a radio terminal by using a first frequency channel included in a plurality of frequency channels. The paging message includes channel identification information used by the radio terminal selecting a second frequency channel included in the plurality of frequency channels. The second frequency channel is used for transmitting a random access signal for establishing connection with the base station.

DESCRIPTION OF EMBODIMENTS (1) Mobile Communication System

Figure 1:
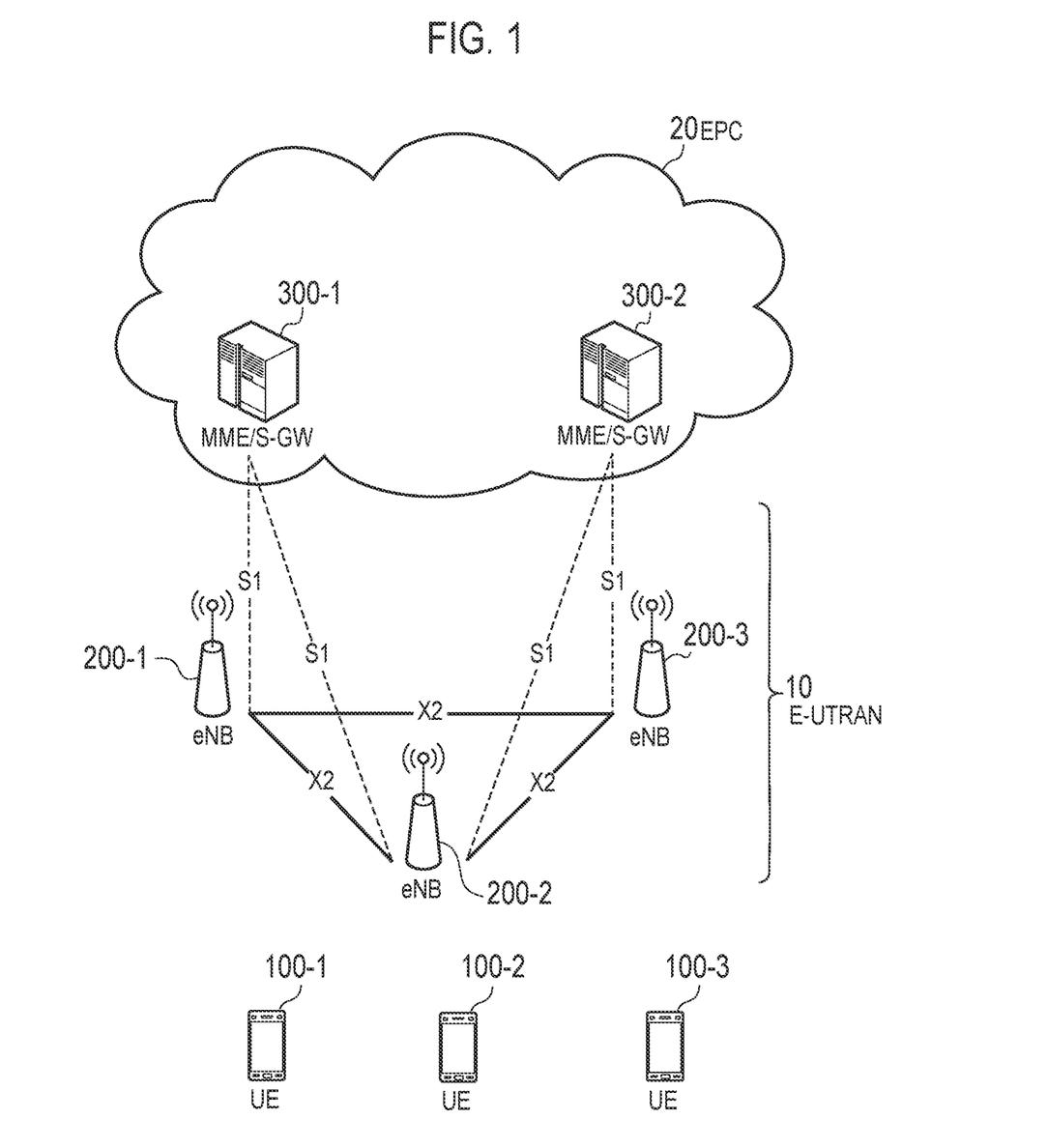
FIG. 1 is a diagram illustrating a configuration of an LTE system (mobile communication system) according to an embodiment.

The configuration of a mobile communication system according to an embodiment is described. FIG. 1 is a view illustrating the configuration of a Long Term Evolution (LTE) system which is the mobile communication system according to the embodiment. The LTE system is a mobile communication system which conforms to a 3GPP standard.

The LTE system includes radio terminals (UE: User Equipments) 100, a radio access network (E-UTRAN: Evolved-UMTS Terrestrial Radio Access Network) 10, and a core network (EPC: Evolved Packet Core) 20.

The UE 100 is a mobile communication apparatus. The UE 100 performs radio communication with an eNB 200 which manages a cell (serving cell) in which the UE 100 per se exists.

The E-UTRAN 10 includes the base stations (eNBs: evolved Node-Bs) 200. The eNBs 200 are interconnected with each other via X2 interfaces. The eNB 200 manages one or a plurality of cells. The eNB 200 performs radio communication with the UE 100 which establishes connection with the own cell. The eNB 200 has a radio resource management (RRM) function, a routing function of user data (hereinafter, simply referred to as "data"), a measurement control function for a mobility control and scheduling and the like. "Cell" is used as a term indicating a minimum unit of a radio communication area. The "Cell" is used as a term indicating a function or a resource for performing radio communication with the UE 100.

The EPC 20 includes mobility management entities (MMEs) and serving gateways (S-GWs) 300. The MME performs various mobility control and the like for the UE 100. The MME manages information on a tracking area (TA) in which the UE 100 exists by communicating with the UE 100 by using non-access stratum (NAS) signaling. The tracking area is an area including a plurality of cells. The S-GW performs transmission control of data. The MME and S-GW are connected to the eNB 200 via an S1 interface.

Figure 2:
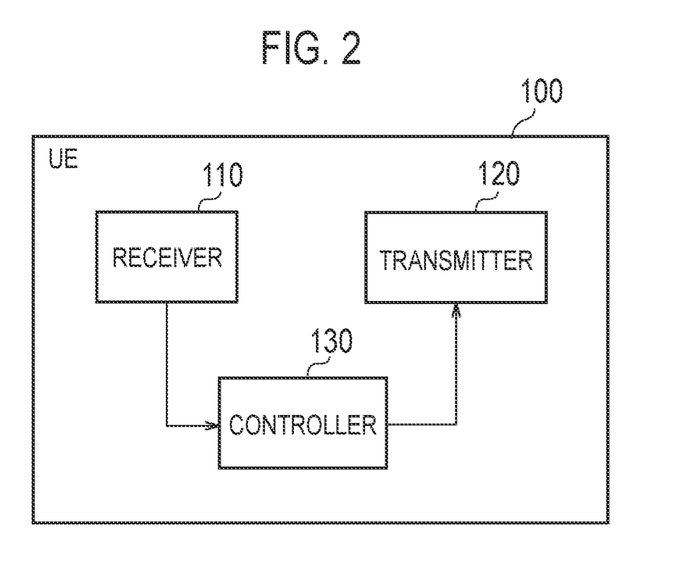
FIG. 2 is a diagram illustrating a configuration of a UE (radio terminal) according to the embodiment.

FIG. 2 is a view illustrating the configuration of the UE 100 (radio terminal). The UE 100 includes a receiver 110, a transmitter 120, and a controller 130.

The receiver 110 performs various receptions under a control of the controller 130. The receiver 110 includes an antenna and a reception device. The reception device outputs a radio signal which the antenna receives to the controller 130 after converting the radio signal into a baseband signal (reception signal).

The transmitter 120 performs various transmissions under a control of the controller 130. The transmitter 120 includes an antenna and a transmission device. The transmission device transmits a baseband signal (transmission signal) which the controller 130 outputs from the antenna after converting the baseband signal into a radio signal.

The controller 130 performs various controls in the UE 100. The controller 130 includes at least one processor and a memory. The memory stores programs executed by the processor and information used in processing performed by the processor. The processor may include a baseband processor and a Central Processing Unit (CPU). The baseband processor performs modulation/demodulation, coding/decoding and the like of the baseband signal. The CPU performs various processing by executing programs stored in the memory. The processor performs processing described later.

Figure 3:
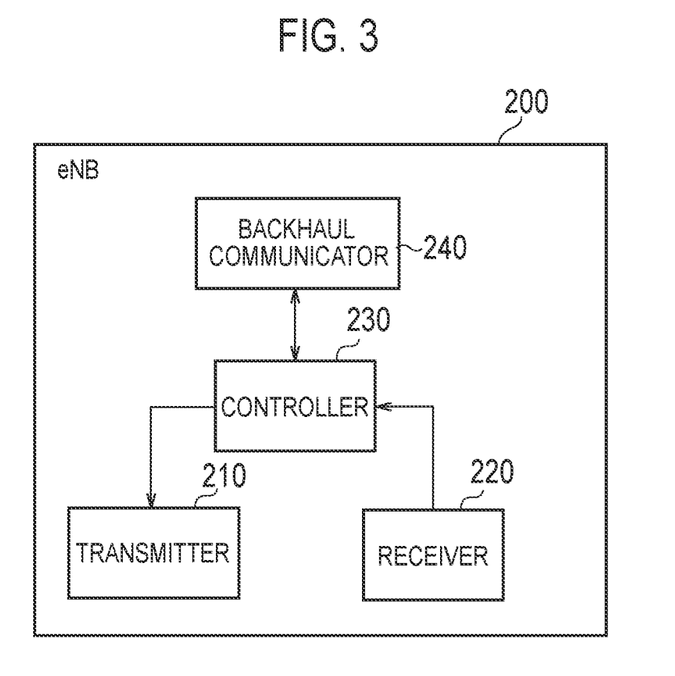
FIG. 3 is a diagram illustrating a configuration of an eNB (base station) according to the embodiment.

FIG. 3 is a view illustrating the configuration of the eNB 200 (base station). The eNB 200 includes a transmitter 210, a receiver 220, a controller 230, and a backhaul communication part 240.

The transmitter 210 performs various transmissions under a control of the controller 230. The transmitter 210 includes an antenna and a transmission device. The transmission device transmits a baseband signal (transmission signal) which the controller 230 outputs from the antenna after converting the baseband signal into a radio signal.

The receiver 220 performs various receptions under a control of the controller 230. The receiver 220 includes an antenna and a reception device. The reception device outputs a radio signal which the antenna received to the controller 230 after converting the radio signal into a baseband signal (reception signal).

The controller 230 performs various controls in the eNB 200. The controller 230 includes at least one processor and a memory. The memory stores programs executed by the processor and information used for processing performed by the processor. The processor may include a baseband processor and a CPU. The baseband processor performs modulation/demodulation and coding/decoding and the like of the baseband signal. The CPU performs various processing by executing programs stored in the memory. The processor performs processing described later.

The backhaul communication part 240 is connected to the neighboring eNB via the X2 interface. The backhaul communication part 240 is connected to the MME/S-GW 300 via the S1 interface. The backhaul communication part 240 is used for communication performed on the X2 interface, communication performed on the S1 interface and the like.

Figure 4:
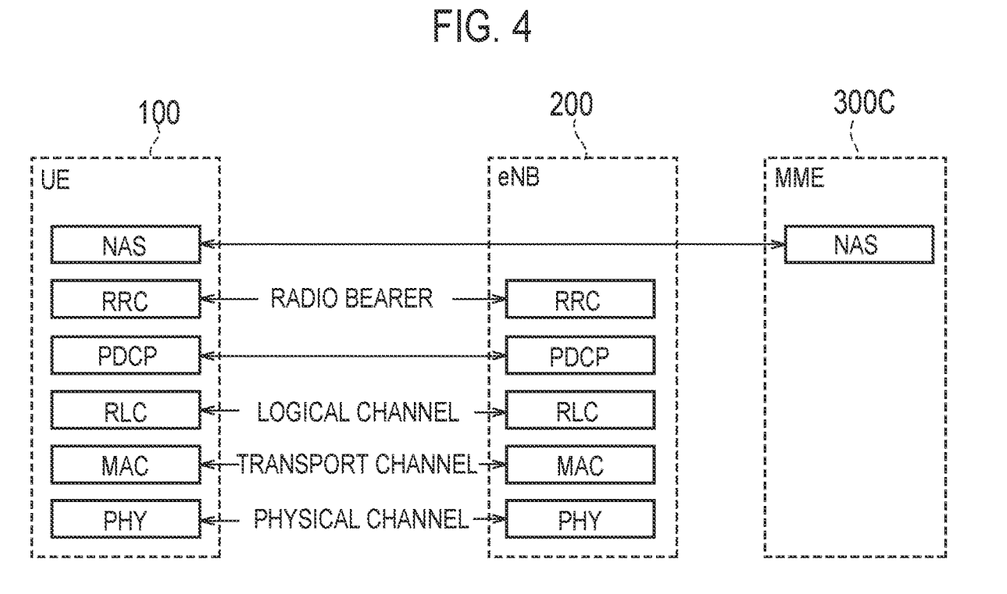
FIG. 4 is a diagram illustrating a protocol stack of a radio interface in the LTE system according to the embodiment.

FIG. 4 is a view illustrating the configuration of a protocol stack of a radio interface in the LTE system. As illustrated in FIG. 4, the radio interface protocol is divided into a first layer to a third layer in an OSI reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer. A Access Stratum (AS) consists of the PHY layer, the MAC layer, the RLC layer, the PDCP layer, and the RRC layer.

The PHY layer performs coding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs a priority control of data, retransmission processing by a hybrid ARQ (HARQ), a random access procedure and the like. Data and control information are transmitted between the MAC layer of the UE 100 and the MAC layer of the eNB 200 via a transport channel. The MAC layer of the eNB 200 includes a scheduler. The scheduler decides a transport format (a transport block size, a modulation/coding method (MCS)) of an uplink and a downlink and an allocation resource block to the UE 100.

The RLC layer transmits data to the RLC layer on a reception side using functions of the MAC layer and the PHY layer. Data and control information are transmitted between the RLC layer of the UE 100 and the RLC layer of the eNB 200 via a logical channel.

A PDCP layer performs header compression/expansion and ciphering/deciphering.

The RRC layer is defined only on a control plane where control information is handled. RRC signaling for various establishment is transmitted between the RRC layer of the UE 100 and the RRC layer of the eNB 200. The RRC layer controls a logical channel, a transport channel, and a physical channel in response to the establishment, the re-establishment and the release of a radio bearer. When the connection (RRC connection) is established between the RRC of the UE 100 and the RRC of the eNB 200, the UE 100 is in an RRC connected mode. When the connection (RRC connection) is not established between the RRC of the UE 100 and the RRC of the eNB 200, the UE 100 is in an RRC idle mode.

A NAS layer which is a higher layer of the RRC layer performs session management, mobility management, and the like. NAS signaling is transmitted between the NAS layer of the UE 100 and the NAS layer of an MME 300C. The UE 100 has a function of an application layer or the like in addition to the radio interface protocol.

Figure 5:
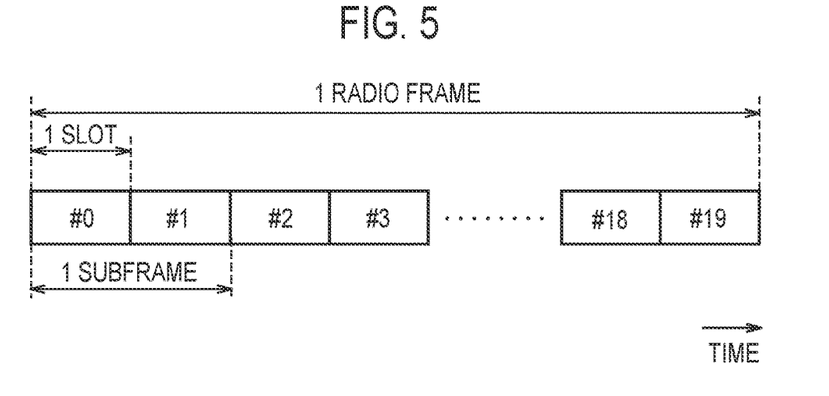
FIG. 5 is a diagram illustrating a configuration of a radio frame of the LTE system according to the embodiment.

FIG. 5 is a diagram illustrating a configuration of a radio frame used in an LTE system. The radio frame includes ten subframes on a time axis. Each subframe includes two slots on the time axis. A length of each subframe is 1 ms. A length of each slot is 0.5 ms. Each subframe includes a plurality of resource blocks (RBs) on a frequency axis. Each subframe includes a plurality of symbols on the time axis. Each resource block includes a plurality of subcarriers on the frequency axis. Specifically, 12 subcarriers and one slot constitute one RB. One symbol and one subcarrier constitute one resource element (RE). Among radio resources (time and frequency resources) allocated to the UE 100, a frequency resource can be specified by the resource blocks, and a time resource can be specified by the subframes (or slots).

In a downlink, a period of several leading symbols of each subframe is an area as a physical downlink control channel (PDCCH) for primarily transmitting downlink control information. A remaining portion of each subframe is an area capable of being used as a physical downlink shared channel (PDSCH) for primarily transmitting downlink data.

In an uplink, both end portions of each subframe in a frequency direction are areas used as physical uplink control channels (PUCCHs) for primarily transmitting uplink control information. A remaining portion of each subframe is an area capable of being used as a physical uplink shared channel (PUSCH) for primarily transmitting uplink data.

(2) Outline of eMTC and NB-IoT

The outline of eMTC and NB-IoT will be described. In the embodiment, a scenario in which the UEs 100 belonging to new categories which provide MTC and IoT services are present is assumed. The UEs 100 belonging to the new categories are the UEs 100 each having a transmission and reception bandwidth restricted to only a part of a system transmission and reception band (LTE transmission and reception bandwidth). For example, the new UE categories are referred to as a category M1 and a category narrow band (NB)-IoT. The category M1 is a category to which enhanced machine type communications (eMTC) UEs belong. The category NB-IoT (category NB1) is a category to which NB-IoT UEs belong. The category M1 restricts the transmission and reception bandwidth of the UE 100 (eMTC UE) to 1.08 MHz (that is, a bandwidth of six resource blocks). The category NB-IoT (category NB1) further restricts the transmission and reception bandwidth of the UE 100 (NB-IoT UE) to 180 kHz (that is, a bandwidth of one resource block). It is possible to realize low cost and low power consumption required of the eMTC UE and the NB-IoT UE by narrowing the bandwidth in this manner. Hereinafter, one frequency band with which the eMTC UE and the NB-IoT UE can cope is referred to as a "frequency channel".

Figure 6:
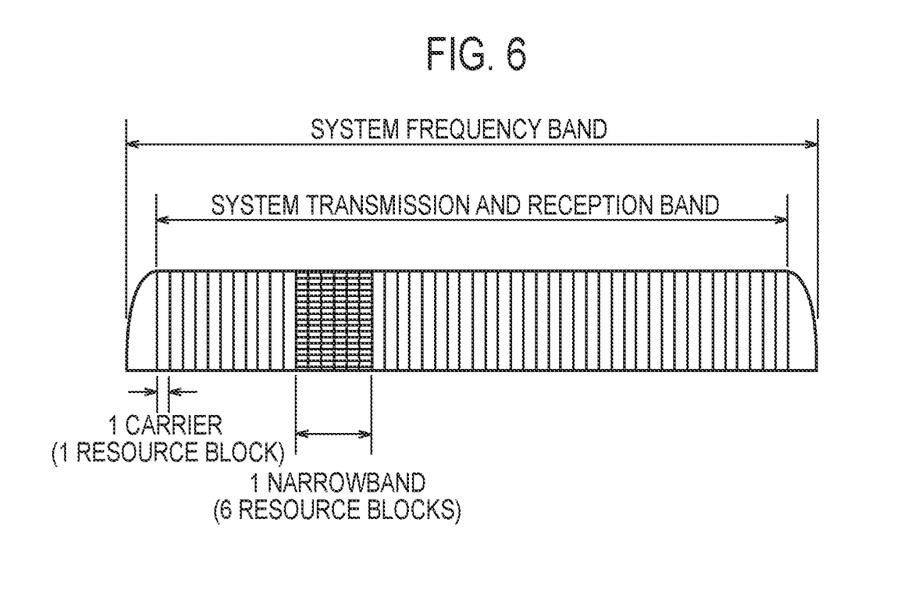
FIG. 6 is a diagram illustrating a frequency channel used by an eMTC UE and an NB-IoT UE according to the embodiment.

FIG. 6 is a diagram illustrating the frequency channel used by the eMTC UE and the NB-IoT UE. As illustrated in FIG. 6, a frequency bandwidth of a system frequency band of the LTE system may be 10 MHz. A bandwidth of the system transmission and reception band is, for example, 50 resource blocks=9 MHz. A bandwidth of the frequency channel with which the eMTC UE can cope is six resource blocks=1.08 MHz. The frequency channel of six resource blocks or less with which the eMTC UE can cope is referred to as a "narrowband (NB)". A bandwidth of the frequency channel with which the NB-IoT UE can cope is one resource block=180 kHz. The frequency channel of one resource block with which the NB-IoT UE can cope is referred to as a "carrier".

The eMTC UE is operated within the LTE transmission and reception bandwidth. The NB-IoT UE supports a form that is operated within the LTE transmission and reception bandwidth, a form that is operated in a guard band outside the LTE transmission and reception bandwidth, and a form that is operated within a dedicated NB-IoT frequency band.

The eMTC UE and the NB-IoT UE support an enhanced coverage (EC) function using repetitive transmission and the like in order to realize coverage widening (coverage enhancement). The enhanced coverage function may include repetitive transmission (repetition) for repetitively transmitting the same signal by using a plurality of subframes. As the number of times of the repetitive transmission becomes larger, it is possible to enhance the coverage. The enhanced coverage function may include power boosting for increasing a power density of a transmit signal. For example, the power density is increased by narrowband transmission for narrowing a frequency bandwidth of the transmit signal. As the power density of the transmit signal becomes higher, it is possible to enhance the coverage. The enhanced coverage function may include lower MCS transmission for lowering an MCS used for the transmit signal. It is possible to enhance the coverage by performing transmission by using an MCS with a low data rate and high error resilience.

(3) Paging and Random Access of NB-IoT UE

The Paging and random access of the NB-IoT UE will be described.

Hereinafter, an example in which the UE 100 is the NB-IoT UE will be described. However, the UE 100 may be the eMTC UE. When the UE 100 is the eMTC UE, the "narrowband (NB)" may be used instead of the "carrier".

Figure 7:
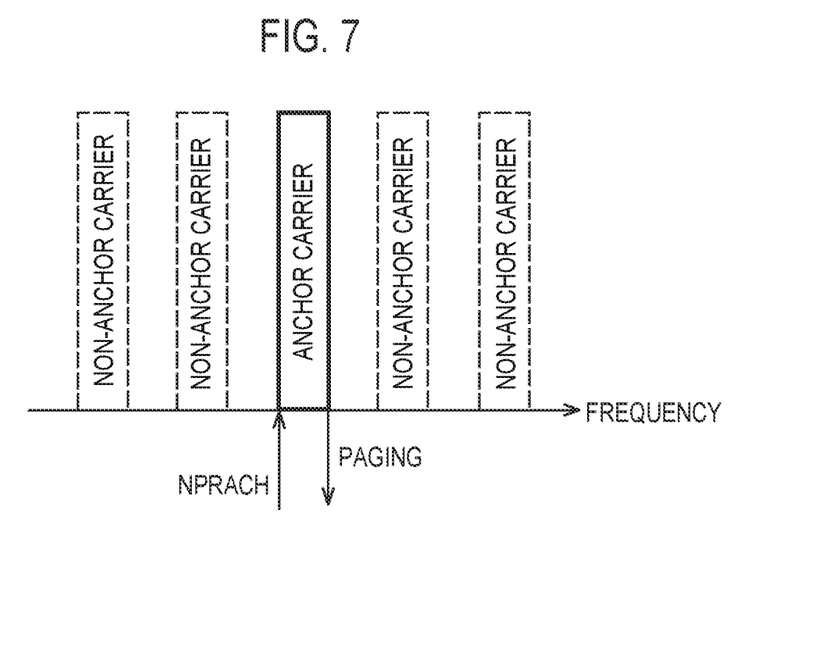
FIG. 7 is a diagram illustrating an example of paging and random access of the NB-IoT UE in a 3GPP Release 13 specification.

FIG. 7 is a diagram illustrating an example of the paging and random access of the NB-IoT UE in a 3GPP Release 13 specification. As illustrated in FIG. 7, the eNB 200 manages a plurality of carriers. Each of the plurality of carriers is operated within the LTE transmission and reception bandwidth, within the guard band outside the LTE transmission and reception bandwidth, or within the dedicated NB-IoT frequency band. The plurality of carriers includes anchor carriers and non-anchor carriers. The UE 100 assumes that the anchor carrier is a carrier which transmits a narrowband primary synchronization signal (NPSS), a narrowband secondary synchronization signal (NSSS), a narrowband physical broadcast channel (NPBCH), and a system information block-narrowband (SIB-NB). The NPSS and the NSSS are physical synchronization signals for the NB-IoT UE. The NPBCH is a physical broadcast channel for the NB-IoT UE. The SIB-NB is a SIB for the NB-IoT UE. The UE 100 assumes that the non-anchor carrier is a carrier which does not transmit the NPSS, the NSSS, the NPBCH, and the SIB-NB. Information on the carrier defined as a carrier that may be used as the anchor carrier in the specification may be configured for the UE 100 in advance.

In the 3GPP Release 13 specification, the anchor carrier is used in paging and random access procedures. Specifically, the eNB 200 transmits a paging message addressed to the UE 100 in an RRC idle mode by using the anchor carrier. The UE 100 receives the paging message addressed to the UE itself. The UE 100 starts the random access procedure for transitioning to an RRC connected mode from the RRC idle mode in response to the reception of the paging message. Specifically, the UE 100 transmits a random access signal to the eNB 200 by using the anchor carrier. The random access signal may be referred to as a random access preamble. The physical channel used by the NB-IoT UE which transmits the random access signal is referred to as a narrowband physical random access channel (NPRACH).

The eNB 200 may configure the non-anchor carrier for the UE 100 that transitions to the RRC connected mode from the RRC idle mode through the random access procedure. The UE 100 for which the non-anchor carrier is configured communicates with the eNB 200 by using only the non-anchor carrier during the RRC connected mode. A radio resource for transmitting the synchronization signal, the paging message, and the broadcast information (SIB) may not be allocated to the non-anchor carrier. Accordingly, a radio resource for data allocated to the non-anchor carrier may be further increased than a radio resource allocated to the anchor carrier.

Figure 8:
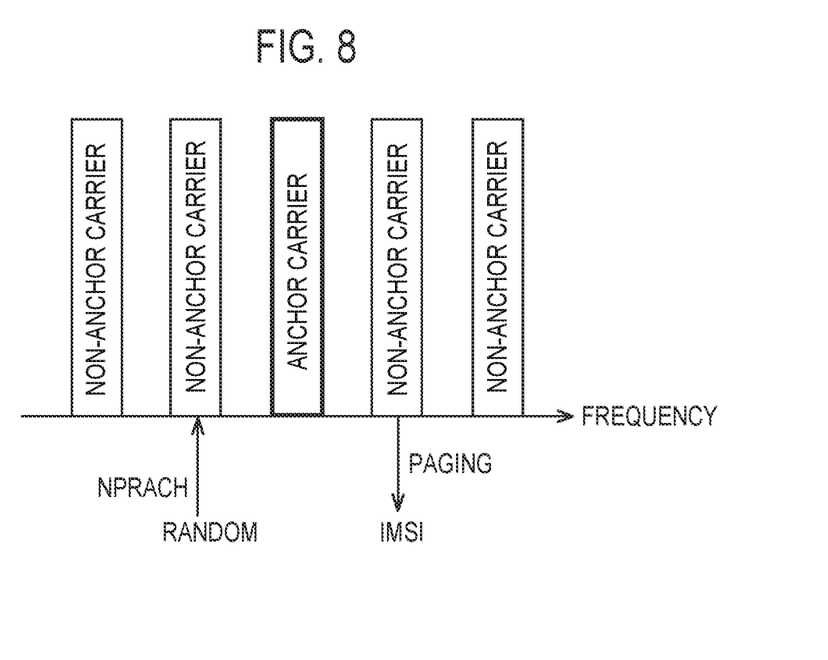
FIG. 8 is a diagram illustrating an example of paging and random access of the NB-IoT UE in a 3GPP Release 14 specification.

FIG. 8 is a diagram illustrating an example of paging and random access of the NB-IoT UE in a 3GPP Release 14 specification. In the 3GPP Release 13, not only the anchor carrier but also the non-anchor carrier may be used in the paging and random access procedures. Specifically, the eNB 200 and the UE 100 select carriers used for transmitting and receiving the paging message based on an identifier of the UE 100 as a destination of the paging message. An international mobile subscriber identity (IMSI) stored in a user identity module (UIM) of the UE 100 is used as such an identifier. The UE 100 receives the paging message addressed to the UE itself by using the carrier selected based on the UIM or IMSI. The UE 100 starts the random access procedure for transitioning to an RRC connected mode from the RRC idle mode in response to the reception of the paging message. Specifically, the UE 100 transmits the random access signal (NPRACH) to the eNB 200 by using the randomly selected carrier. Due to the use of such a carrier selection method, it is possible to avoid load concentration on the anchor carrier, and it is possible to distribute a load to the non-anchor carrier.

Figure 9:
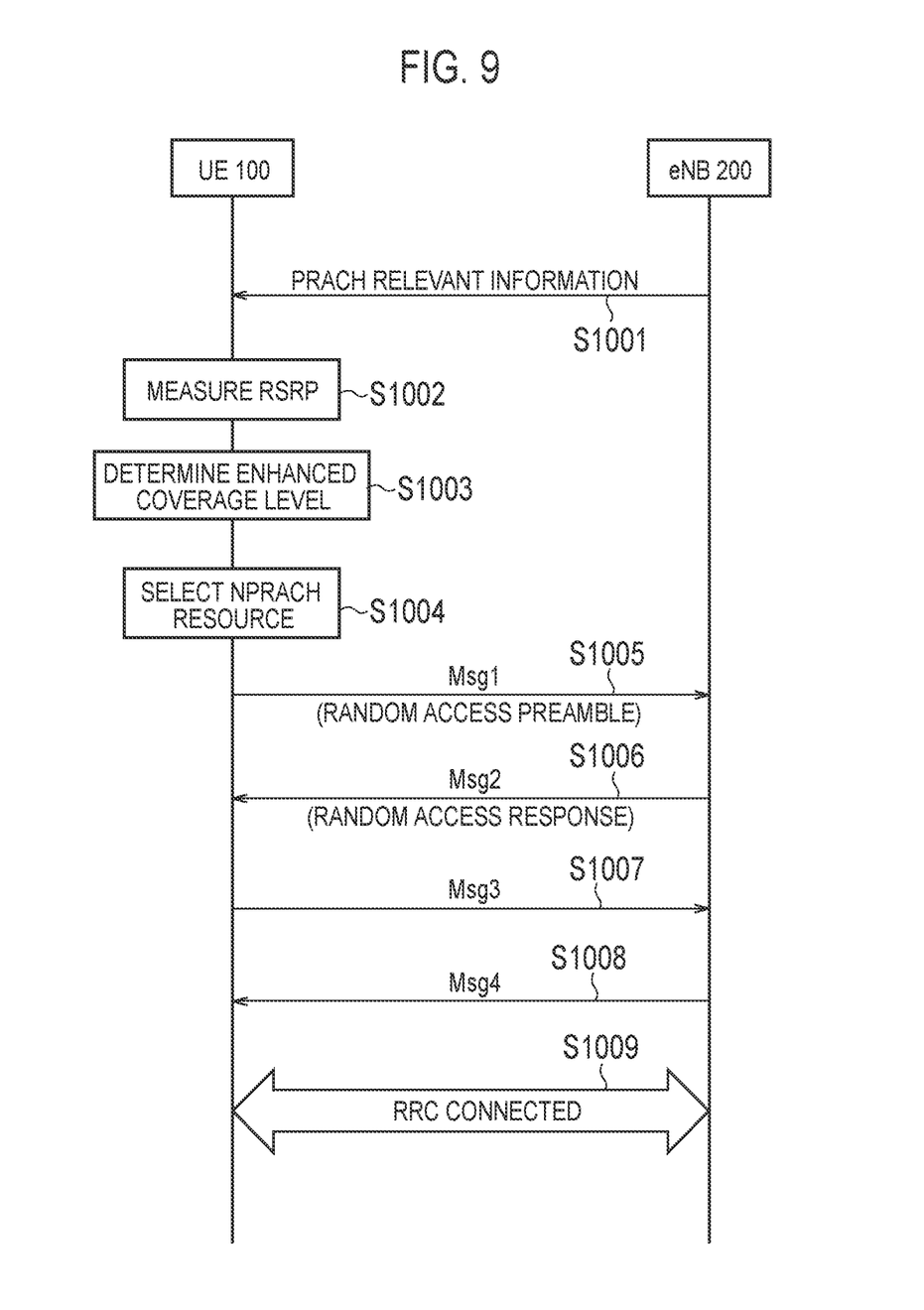
FIG. 9 is a diagram illustrating an example of a random access procedure for the NB-IoT UE.

FIG. 9 is a diagram illustrating an example of the random access procedure for the NB-IoT UE. The UE 100 performs the random access procedure in order to transition to the RRC connected mode from the RRC idle mode.

The UE 100 in the RRC idle mode selects a cell of the eNB 200 as a serving cell. When a first cell selection criteria (first S-criteria) for a normal coverage is not satisfied and a second cell selection criteria (second S-criteria) for an enhanced coverage is satisfied, the UE 100 may determine that the UE itself is present in the enhanced coverage. The "UE present in the enhanced coverage" means a UE required to use the enhanced coverage function (enhanced coverage mode) in order to access the cell.

In step S1001, the eNB 200 transmits NPRACH relevant information by broadcast signaling (for example, SIB type 2-NB). The NPRACH relevant information includes various parameters prepared for enhanced coverage levels. For example, a total of four enhanced coverage levels from 0 to 3 are assumed as the enhanced coverage levels. The various parameters include a reference signal received power (RSRP) threshold, an NPRACH resource, and the maximum number of times of the preamble transmission. The NPRACH resource includes radio resources (time and frequency resource) and a signal sequence (preamble sequence). The UE 100 stores the received NPRACH relevant information.

In step S1002, the UE 100 measures an RSRP based on a reference signal transmitted from the eNB 200.

In step S1003, the UE 100 determines the enhanced coverage level of the UE itself by comparing the measured RSRP with the RSRP threshold for each enhanced coverage level. The enhanced coverage level indicates a degree of the enhanced coverage required by the UE 100. The enhanced coverage level is related to at least the number of times of transmission (that is, the number of times of repetition) in the repetitive transmission.

In step S1004, the UE 100 selects the NPRACH resource corresponding to the enhanced coverage level of the UE itself. The UE 100 may select the carrier used for the NPRACH transmission (preamble transmission) among the plurality of carriers managed by the eNB 200. The carrier used for the NPRACH transmission (preamble transmission) may be a predetermined anchor carrier or a randomly selected carrier.

In step S1005, the UE 100 transmits Msg 1 (random access preamble) to the eNB 200 by using the selected carrier and the selected NPRACH resource. The eNB 200 specifies the enhanced coverage level of the UE 100 based on the NPRACH resource used for the received Msg 1.

In step S1006, the eNB 200 transmits Msg 2 (random access response) including scheduling information to the UE 100. The scheduling information indicates a narrowband physical uplink shared channel (NPUSCH) resource allocated to the UE 100. The UE 100 may transmit the Msg 1 up to the maximum number of times of the preamble transmission corresponding to the enhanced coverage level of the UE itself by multiple times until the Msg 2 is normally received.

In step S1007, the UE 100 transmits Msg 3 to the eNB 200 based on the scheduling information. The Msg 3 may be an RRC connection request message.

In step S1008, the eNB 200 transmits Msg 4 to the UE 100.

In step S1009, the UE 100 transitions to the RRC connected mode from the RRC idle mode in response to the reception of the Msg 4. Thereafter, the eNB 200 controls the repetitive transmission or the like for the UE 100 based on the specified enhanced coverage level.

(4) Operation according to Embodiment As stated above, it is possible to reduce the load of the anchor carrier in the random access procedure of the 3GPP Release 14 specification compared to the random access procedure of the 3GPP Release 13 specification. However, in the random access procedure of the 3GPP Release 14 specification, the UE 100 randomly selects the carrier used for the NPRACH transmission (preamble transmission). Thus, the UE 100 may select a carrier in a high load state, a temporarily unavailable carrier, or the like. Accordingly, in the random access procedure of the 3GPP Release 14 specification, there is a room for improvement in that the carrier used for the preamble transmission can be appropriately selected.

(4.1) Operation Scenario

Figure 10:
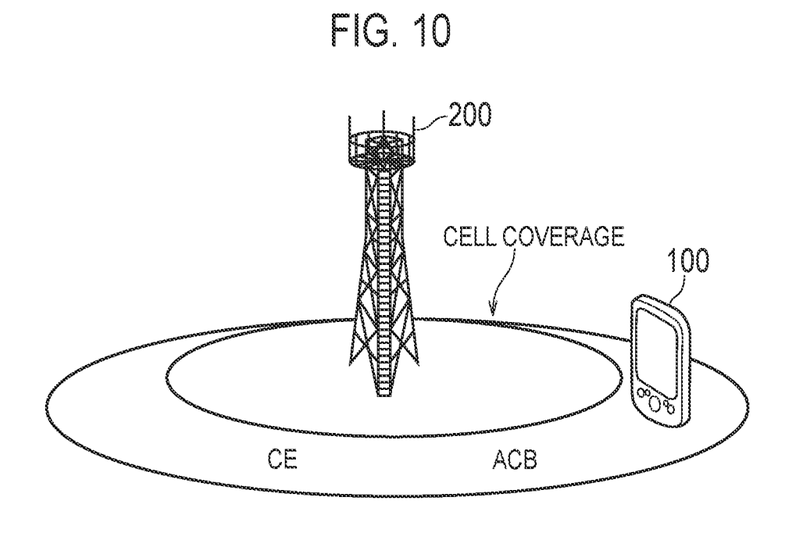
FIG. 10 is a diagram illustrating an operation scenario according to the embodiment.

An operation scenario according to the embodiment will be described. FIG. 10 is a diagram illustrating the operation scenario according to the embodiment. As illustrated in FIG. 10, the UE 100 (NB-IoT UE) is present in an enhanced coverage (CE) of a cell coverage of the eNB 200. The eNB 200 manages a plurality of carriers. The eNB 200 may determine that some carriers of the plurality of carriers are in the high load state or are temporarily unavailable. The eNB 200 may determine to perform access class barring (ACB) on such carriers.

(4.2) Operation Flow

Figure 11:
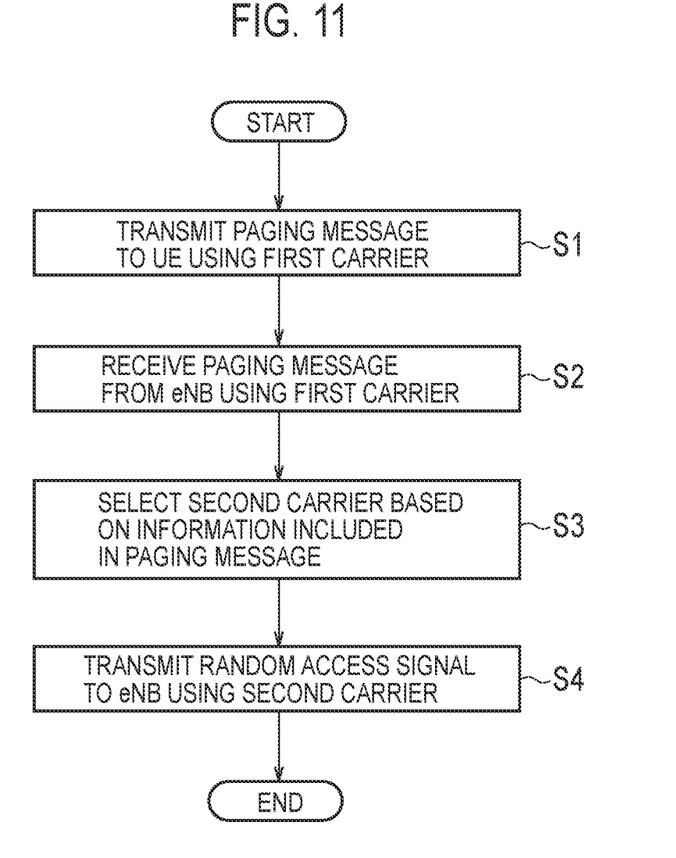
FIG. 11 is a diagram illustrating an operation flow according to the embodiment.

An operation flow according to the embodiment will be described. FIG. 11 is a diagram illustrating the operation flow according to the embodiment. Hereinafter, operations overlapped with the operations of FIG. 9 will not be illustrated. The UE 100 is present in the enhanced coverage (CE) of the cell coverage of the eNB 200. The UE 100 is in the RRC idle mode. For example, the eNB 200 determines to transmit the paging message (RRC paging message) addressed to the UE 100 in response to the reception of the paging message (S1 paging message) addressed to the UE 100 from the MME.

As illustrated in FIG. 11, in step S1, the eNB 200 (transmitter 210) transmits the paging message to the UE 100 by using a first carrier included in the plurality of carriers. The first carrier may be a carrier selected based on the IMSI of the UE 100. The first carrier may be a predetermined anchor carrier. The paging message includes carrier identification information (channel identification information) used for selecting a second carrier used for the preamble transmission. Although the details will be described below, the carrier identification information indicates at least one carrier. The carrier is indicated by at least one of a carrier number, a resource block number, and a frequency. When a pattern including combinations of the carriers is defined, the carrier identification information may indicate the pattern. The pattern may be defined by the specification and may be configured for the UE 100 in advance. The pattern may be configured for the UE 100 from the eNB 200.

In step S2, the UE 100 (receiver 110) receives the paging message from the eNB 200 by using the first carrier.

In step S3, the UE 100 (controller 130) selects the second carrier included in the plurality of carriers. Specifically, the UE 100 selects the second carrier based on the carrier identification information included in the paging message.

In step S4, the UE 100 (transmitter 120) transmits the random access signal (random access preamble) for establishing connection with the eNB 200 by using the second carrier. The eNB 200 (receiver 220) receives the random access preamble from the UE 100 by using the second carrier.

As stated above, the eNB 200 directly or indirectly designates the second carrier used for the preamble transmission by using the carrier identification information included in the paging message. The UE 100 performs the preamble transmission by using the directly or indirectly designated second carrier. Accordingly, the eNB 200 may control such that the UE 100 does not select the carrier in the high load state, the temporarily unavailable carrier, or the like. The eNB 200 may cause the UE 100 to preferentially select the carrier in the high load state. Therefore, it is possible to appropriately select the carrier used for the preamble transmission.

(4.3) Specific Example of Paging Message

A specific example of the paging message (RRC paging message) transmitted to the UE 100 from the eNB 200 will be described. The paging message further includes a plurality of destination identifiers which each indicate the plurality of UEs 100 to which the paging message is addressed. A list including the plurality of destination identifiers may be referred to as a paging record list. The destination identifier may include the IMSI.

For example, the carrier identification information included in the paging message is common information which is commonly applied to the plurality of destination identifiers (paging record list). In other words, the carrier identification information included in the paging message is commonly applied to the plurality of UEs 100 to which the paging message is addressed.

As another example, the carrier identification information included in the paging message is dedicated information which is individually applied to the plurality of destination identifiers. In other words, the carrier identification information included in the paging message is individually applied to the plurality of UEs 100 to which the paging message is addressed. In the paging message, the destination identifier and the carrier identification information may be provided in a one-to-one correspondence. In step S3 of FIG. 11, the UE 100 may specify the carrier identification information (that is, the dedicated carrier identification information of the UE 100) corresponding to the identifier of the UE itself from the paging message, and may select the second carrier based on the specified carrier identification information.

(4.4) Specific Example of Carrier Identification Information

A specific example of the carrier identification information included in the paging message will be described.

As a first example, the carrier identification information is information indicating one carrier to be used as the second carrier. The carrier identification information may be information indicating a carrier number of the one carrier, a resource block number of a resource block corresponding to the one carrier, or a frequency of the one carrier. In the first example, the UE 100 selects one carrier indicated by the carrier identification information, as the second carrier (step S3 of FIG. 11).

As a second example, the carrier identification information is information indicating a plurality of carriers permitted to be used as the second carrier. The carrier identification information may be a list of carrier numbers of the plurality of carriers, a resource block number list of a plurality of resource blocks corresponding to the plurality of carriers, or a frequency list of the plurality of carriers. In the second example, the UE 100 selects the carrier to be used as the second carrier among the plurality of carriers indicated by the carrier identification information (step S3 of FIG. 11). The UE 100 may randomly select the second carrier among the plurality of carriers indicated by the carrier identification information.

As a third example, the carrier identification information is information indicating one or a plurality of carriers prohibited from being used as the second carrier. A specific configuration method of the carrier identification information is the same as the first example and the second example. In the third example, the UE 100 selects the carrier to be used as the second carrier among carriers other than the one or a plurality of carriers indicated by the carrier identification information (step S3 of FIG. 11). The UE 100 may randomly select the second carrier among the carriers other than the one or a plurality of carriers indicated by the carrier identification information.

In the third example, the eNB 200 may broadcast system information (SIB) including information indicating one or a plurality of carriers permitted to be used as the second carrier. The UE 100 may select the carrier to be used as the second carrier other than the one or a plurality of carriers (prohibited carrier) indicated by the carrier identification information among the carriers (available carriers) indicated by the SIB.

Combinations of two or more methods of the first example to the third example (the first method to the third method) may be performed.

One example of the aforementioned first example to the third example (the first method to the third method) may be selectively used. The eNB 200 may notify the UE 100 of information indicating one method of the first method to the third method. Such information may be included in the paging message or the SIB. The UE 100 interprets the content of the carrier identification information according to the method notified from the eNB 200.

(4.5) Example of Operation Sequence

Figure 12:
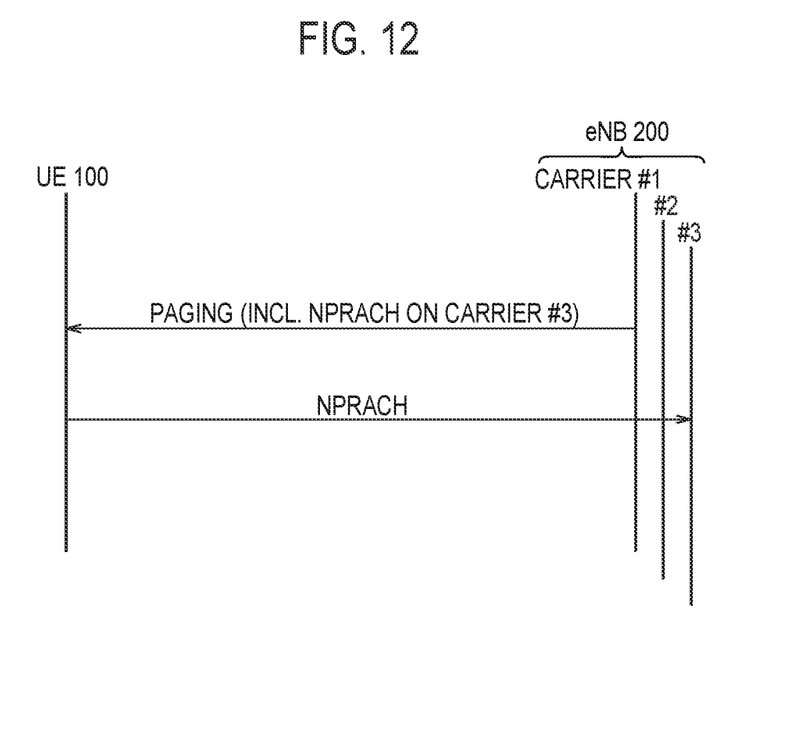
FIG. 12 is a diagram illustrating an example of an operation sequence according to the embodiment.

FIG. 12 is a diagram illustrating an example of an operation sequence according to the embodiment. The eNB 200 manages three carriers (carriers #1 to #3). The eNB 200 may determine that the carrier #3 of the three carriers is preferably used as the second carrier.

As illustrated in FIG. 12, the eNB 200 transmits the paging message (Paging) to the UE 100 by using the carrier #1. The carrier #1 may be a carrier selected based on the IMSI of the UE 100. The carrier #1 may be a predetermined anchor carrier. The paging message includes the carrier identification information used for selecting the second carrier used for the preamble transmission. In the example of FIG. 12, the carrier identification information is information designating the carrier #3 (NPRACH on carrier #3) as the second carrier used for the preamble transmission. The UE 100 receives the paging message. The UE 100 selects the carrier #3 as the second carrier based on the carrier identification information included in the paging message. The UE 100 performs the preamble transmission (NPRACH transmission) by using the carrier #3.

(4.6) Modification Example 1

It is assumed that the aforementioned preamble transmission is contention-based preamble transmission. However, the preamble transmission may be non-contention-based preamble transmission.

In Modification Example 1, the paging message further includes a random access signal parameter applied to the random access signal (random access preamble). The random access signal parameter may be dedicated information which is individually applied to the plurality of destination identifiers included in the paging message. In the paging message, the destination identifier and the random access signal parameter may be provided in a one-to-one correspondence. The random access signal parameter indicates at least one of the signal sequence (preamble sequence) and the radio resource (NPRACH resource).

In Modification Example 1, the UE 100 specifies the random access signal parameter corresponding to the identifier of the UE itself from the paging message, and determines at least one of the signal sequence (preamble sequence) and the radio resource (NPRACH resource) based on the specified carrier identification information. The UE 100 transmits the random access preamble to which the random access signal parameter included in the paging message is applied by using the second carrier (step S4 of FIG. 11). Accordingly, it is possible to avoid collision of the preamble transmission on the second carrier.

(4.7) Modification Example 2

In the aforementioned embodiment, the example in which one eNB 200 manages the plurality of carriers has been described. However, the plurality of carriers may be managed by a plurality of eNBs 200. For example, it is assumed in FIG. 12 that the carrier #1 is managed by a first eNB and the carriers #2 and #3 are managed by a second eNB.

In such a scenario, each eNB may notify another eNB of information indicating a congestion degree on the carrier managed by the eNB itself via an X2 interface. For example, the second eNB that manages the carriers #2 and #3 may notify the first eNB of congestion degree information (for example, a utilization rate of the radio resource) indicating congestion degrees of the carriers #2 and #3.

Each eNB may notify another eNB of recommended carrier information indicating a carrier of the carriers managed by the eNB itself which is recommended to be used for the preamble transmission (NPRACH transmission) via the X2 interface. For example, the second eNB that manages the carriers #2 and #3 may notify the first eNB of information indicating the carrier #3, as the carrier recommended to be used for the preamble transmission.

Each eNB may notify another eNB of prohibited carrier information indicating a carrier of the carriers managed by the eNB itself which is prohibited from being used for the preamble transmission (NPRACH transmission) via the X2 interface. For example, the second eNB that manages the carriers #2 and #3 may notify the first eNB of information indicating the carrier #2, as the carrier prohibited from being used for the preamble transmission.

Combinations of two or more information of the congestion degree information, the recommended carrier information, and the prohibited carrier information may be used.

The first eNB may request the second eNB to transmit the aforementioned notification via the X2 interface. The second eNB may transmit the aforementioned notification to the first eNB in response to the reception of the request from the first eNB. The request may include information indicating the carrier as a notification target. The request may include information indicating which information of the congestion degree information, the recommended carrier information, and the prohibited carrier information is requested to be transmitted.

(4.8) Comparative Example

The operation for adding the carrier identification information used for selecting the second carrier to the paging message has been described in the aforementioned embodiment. In a comparative example, an operation for adding the carrier identification information to the system information (SIB) instead of the paging message is assumed.

In the comparative example, the carrier identification information is added to the system information which is periodically broadcasted by the eNB 200. However, since a transmission cycle of the system information is determined, there is a problem that it is difficult to dynamically change the system information. A change notification (SIB update) of the system information needs to be transmitted to the UE 100 before the content of the system information is changed. Since the UE 100 needs to monitor the change notification, there is a problem that power consumption of the UE 100 is increased.

In contrast, it is possible to transmit the carrier identification information to an appropriate UE 100 in an appropriate timing by adding the carrier identification information to the paging message. Specifically, in the method of adding the carrier identification information to the paging message, it is possible to perform more dynamic control (carrier designation), and it is possible to reduce a reception load (power consumption) of the UE 100.

(Other Embodiments)

In the aforementioned embodiment, the example in which the UE 100 is the NB-IoT UE has been described. However, the UE 100 may be the eMTC UE. When the UE 100 is the eMTC UE, the "narrowband (NB)" may be used instead of the "carrier" in the operation according to the aforementioned embodiment. The "PRACH" may be used instead of "NPRACH". The UE 100 may be a normal LTE UE. When the UE 100 is the normal LTE UE, the "frequency (carrier frequency)" may be used instead of the "carrier" in the operation according to the aforementioned embodiment.

In the aforementioned embodiment, the presence of a legacy UE that is not capable of recognizing the carrier identification information has not been considered. The legacy UE may ignore the carrier identification information included in the paging message. The legacy UE may perform the preamble transmission by using the predetermined anchor carrier or the randomly selected carrier.

The scenario in which the UE 100 is present in the enhanced coverage (CE) of the cell coverage of the eNB 200 has been assumed in the aforementioned embodiment. However, the operation according to the aforementioned embodiment may be used in a scenario in which the UE 100 is not present in the enhanced coverage (CE) (that is, a scenario in which the UE 100 is present in a normal cell coverage).

A program causing a computer to perform various processing performed by the UE 100 and the eNB 200 may be provided. The program may be recorded in a computer-readable medium. When the computer-readable medium is used, the program may be installed on the computer. In this example, the computer-readable medium having the program recorded therein may be a non-transitory recording medium. The non-transitory recording medium is not particularly limited, and may be, for example, a recording medium such as a CD-ROM or a DVD-ROM. A chipset constituted by a memory that stores the program for performing various processing performed by the UE 100 and the eNB 200 and a processor that executes the program stored in the memory may be provided.

It has been described in the aforementioned embodiment that the LTE system is used as the mobile communication system. However, the present disclosure is not limited to the LTE system. The operation according to the aforementioned embodiment may be applied to a mobile communication system (for example, 5th Generation mobile communication system) other than the LTE system.

The invention claimed is:

1. A communication control method used in a mobile communication system, comprising:
   transmitting, by a base station, a paging message to a radio terminal by using a first frequency channel included in a plurality of frequency channels;
   receiving, by the radio terminal, the paging message;
   selecting, by the radio terminal, a second frequency channel included in the plurality of frequency channels; and
   transmitting, by the radio terminal, a random access signal for establishing connection with the base station by using the second frequency channel, wherein
   the paging message includes channel identification information used for selecting the second frequency channel, and
   in the selecting the second frequency channel, the radio terminal is configured to select the second frequency channel based on the channel identification information included in the paging message, wherein
   the paging message further includes a plurality of destination identifiers which each indicate a plurality of radio terminals to which the paging message is addressed,
   the channel identification information is dedicated information which is individually applied to the plurality of destination identifiers, and
   in the selecting the second frequency channel, the radio terminal is configured to specify, from the paging message, the channel identification information corresponding to an identifier of the radio terminal, and select the second frequency channel based on the specified channel identification information.

2. The communication control method according to claim 1,
   wherein the channel identification information is information indicating one frequency channel to be used as the second frequency channel, and
   in the selecting the second frequency channel, the radio terminal is configured to select the one frequency channel indicated by the channel identification information, as the second frequency channel.

3. The communication control method according to claim 1,
   wherein the channel identification information is information indicating a plurality of channels permitted to be used as the second frequency channel, and
   in the selecting the second frequency channel, the radio terminal is configured to select a frequency channel to be used as the second frequency channel among the plurality of frequency channels indicated by the channel identification information.

4. The communication control method according to claim 1,
   wherein the channel identification information is information indicating one or a plurality of frequency channels prohibited from being used as the second frequency channel, and
   in the selecting the second frequency channel, the radio terminal is configured to select a frequency channel to be used as the second frequency channel among frequency channels other than the one or plurality of frequency channels indicated by the channel identification information.

5. The communication control method according to claim 1,
   wherein the paging message further includes a random access signal parameter applied to the random access signal,
   the random access signal parameter indicates at least one of a signal sequence and a radio resource, and
   in the transmitting the random access signal, the radio terminal is configured to transmit the random access signal to which the random access signal parameter included in the paging message is applied by using the second frequency channel.

6. A radio terminal used in a mobile communication system, comprising:
   a receiver configured to receive, from a base station, a paging message transmitted by using a first frequency channel included in a plurality of frequency channels;
   a controller configured to select a second frequency channel included in the plurality of frequency channels; and
   a transmitter configured to transmit a random access signal for establishing connection with the base station by using the second frequency channel,
   wherein the paging message includes channel identification information used for selecting the second frequency channel, and
   the controller is configured to select the second frequency channel based on the channel identification information included in the paging message,
   wherein the paging message further includes a plurality of destination identifiers which each indicate a plurality of radio terminals to which the paging message is addressed,
   the channel identification information is dedicated information which is individually applied to the plurality of destination identifiers, and
   the controller is configured to specify, from the paging message, the channel identification information corresponding to an identifier of the radio terminal, and select the second frequency channel based on the specified channel identification information.

* * * * *